US012710017B1

(12) United States Patent
Kessler

(10) Patent No.: US 12,710,017 B1

(45) Date of Patent: Aug. 18, 2026

(54) CYLINDER LINER INSTALLATION IN AN OPPOSED-PISTON ENGINE

(71) Applicant: General Atomics Aeronautical Systems, Inc., San Diego, CA (US)

(72) Inventor: John M. Kessler, San Diego, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 0 days.

(21) Appl. No.: 19/175,887

(22) Filed: Apr. 10, 2025

(51) Int. Cl.
*F02F 1/00* (2006.01)

(52) U.S. Cl.
CPC .................................... *F02F 1/004* (2013.01)

(58) Field of Classification Search
CPC ........ F02F 1/004; F02F 1/08; F02F 2001/006; F02F 11/005
See application file for complete search history.

(56) References Cited

U.S. PATENT DOCUMENTS 2,674,988 A 4/1954 Evans et al.
3,304,134 A 2/1967 Allen
3,568,573 A 3/1971 Bailey et al.
4,955,328 A * 9/1990 Sobotowski ............ F02B 73/00 123/59.6
5,083,537 A 1/1992 Onofrio et al.
5,299,871 A 4/1994 Hancock
5,509,387 A 4/1996 Kaminiski et al.
5,564,837 A 10/1996 Putnam et al.
6,076,971 A 6/2000 Warwick et al.
6,328,001 B1 12/2001 Kirtley et al.
6,722,320 B1 4/2004 Pham et al.
8,468,694 B2 6/2013 Moss et al.
10,619,550 B2 4/2020 Perr
10,837,357 B1 11/2020 Meckl et al.
11,041,528 B1 6/2021 Colin et al.
11,946,433 B2 4/2024 Kumareshan et al.
2004/0069253 A1 4/2004 Pham et al.
2010/0154749 A1* 6/2010 Barberato ............... F02B 75/32 123/48 C
2012/0167856 A1 7/2012 Wiebrecht
2012/0204841 A1* 8/2012 Hofbauer ................ F16C 7/023 123/51 BA
2013/0276762 A1* 10/2013 Hofbauer .............. F02B 75/282 123/51 R
2015/0059712 A1* 3/2015 Bakindi ........... F02M 35/10157 123/542
2016/0032861 A1* 2/2016 Fuqua ................... F02B 75/282 123/193.2
2019/0093478 A1* 3/2019 Frasinel .................. F02F 1/004
2020/0049193 A1 2/2020 Perr

* cited by examiner

*Primary Examiner* — Long T Tran
(74) *Attorney, Agent, or Firm* — Knobbe, Martens, Olson & Bear, LLP

(57) ABSTRACT

Combinations are provided for installing a cylinder liner in an opposed-piston engine. A main bearing device including a cylindrical bearing recess for a crankshaft main journal can be removed from a crankcase of the opposed-piston engine to enable insertion of a cylinder liner into a cylinder block of the engine. Once the cylinder liner is inserted, a clamping assembly acting between the cylinder liner and the main bearing device clamps the cylinder liner to the cylinder block.

21 Claims, 11 Drawing Sheets

FIG. 4A
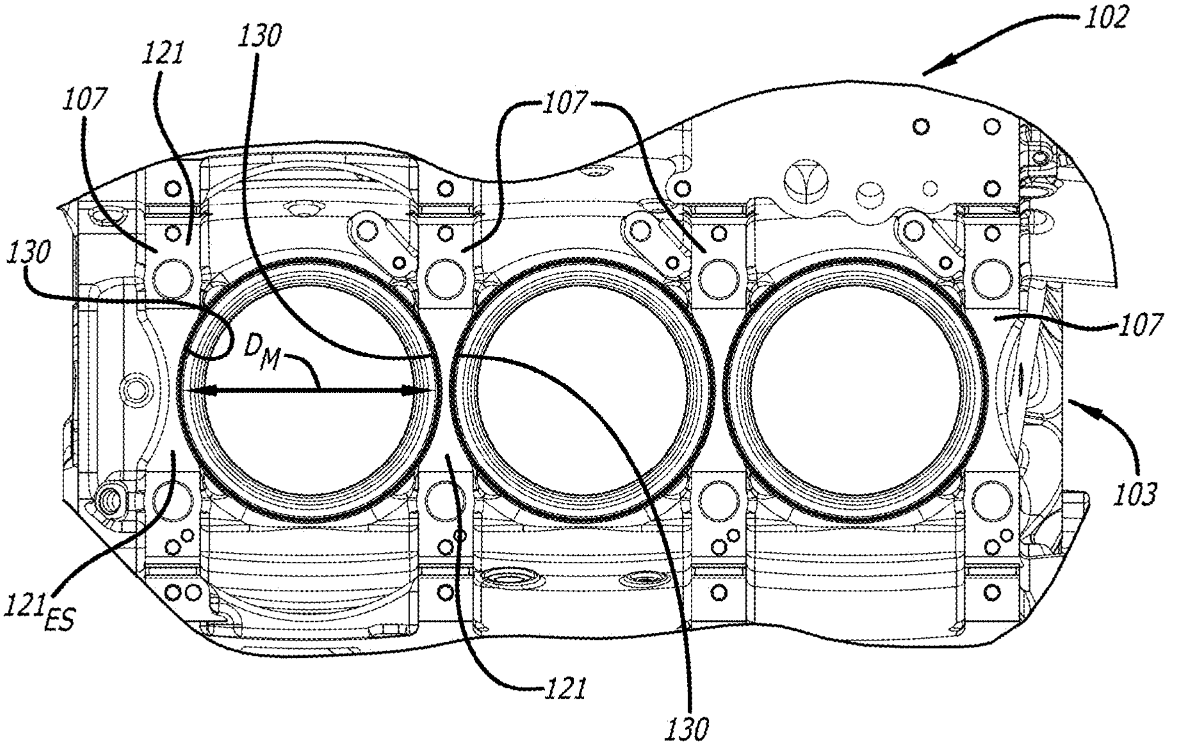
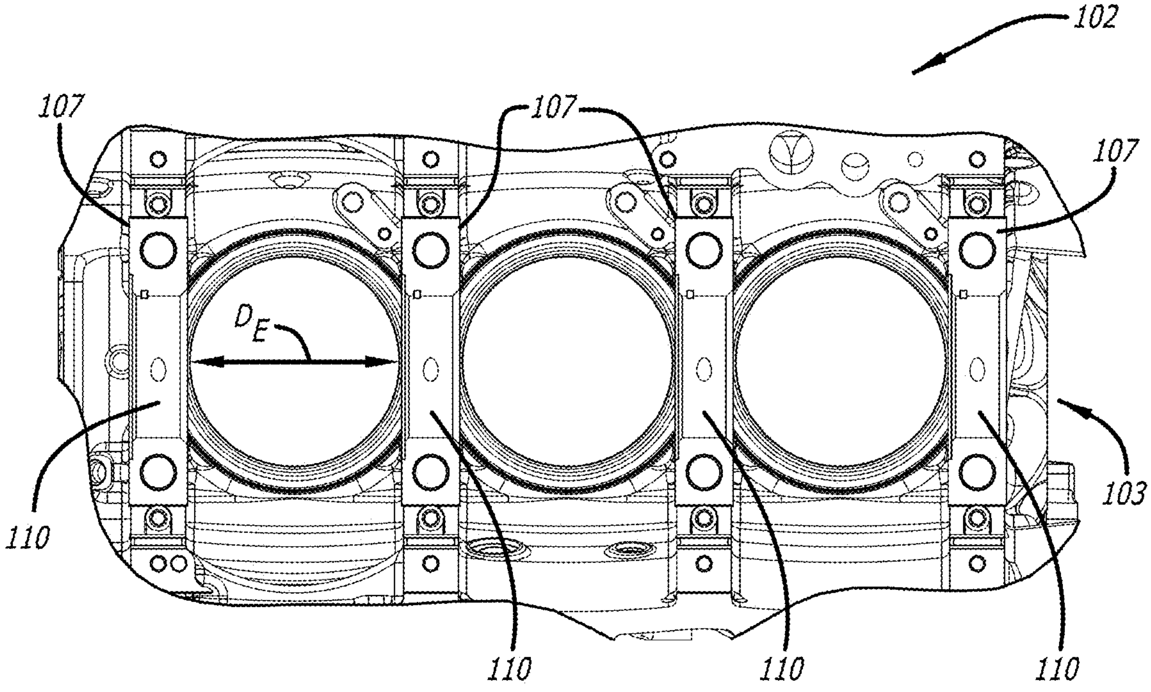
FIG. 4B

CYLINDER LINER INSTALLATION IN AN OPPOSED-PISTON ENGINE

STATEMENT OF GOVERNMENT INTEREST

This Project Agreement Holder invention was made with U.S. Government support under Other Transaction Authority (OTA) Agreement No. W56HZV-22-9-C001 awarded by the U.S. Army Contracting Command. The Government has certain rights in the invention.

FIELD

This disclosure relates generally to installation of a cylinder liner in an opposed-piston, internal combustion engine.

BACKGROUND

A multi-stroke cycle opposed-piston engine (hereinafter, "an opposed-piston engine") has at least one cylinder ("a cylinder") in the bore of which a pair of counter-moving pistons is disposed for reciprocating motion with their end surfaces facing. During operation of the engine, the pistons move in opposing directions, with their end surfaces approaching each other to form a combustion chamber in the bore during a compression stroke, and moving away from each other during an expansion stroke. Piston motion is delivered to at least one crankshaft ("a crankshaft").

FIG. 1 is a schematic representation illustrating basic features of a prior art opposed-piston engine 10. The engine 10 includes a metal cylinder block 11 with a first crankcase 12 and a second crankcase 14. Bulkheads 13 (also called "webs") extend transversely between opposite sides (not shown in FIG. 1) of the cylinder block 11. The cylinder block 11 includes a cylinder 16 and can include a plurality of cylinders 16 aligned in a row.

The row of cylinders 16 can be aligned with an elongate dimension L of the cylinder block 11. Taking the left-most cylinder 16 to be representative of all of the cylinders 16, each cylinder has a bore 18 and an annular intake portion including an intake port 20 separated along the longitudinal axis of the cylinder from an annular exhaust portion including an exhaust port 22. Each of the intake and exhaust ports includes one or more circumferential arrays of openings in which adjacent openings are separated by a bridge, which is a solid portion of the cylinder wall. In some descriptions, each opening may be referred to as a "port"; however, the construction of a circumferential array of such "ports" is no different than the port constructions in FIG. 1 in which the openings are referred to collectively as a port. The cylinders 16 are arranged such that their intake and exhaust portions are aligned on respective sides of the row. Two counter-moving pistons 30 control the intake ports of the cylinders; the pistons 32 control the exhaust ports. A crankshaft 34 is rotatably supported by main bearings B1 along the intake portions of the cylinders 16, in parallel alignment with the elongate dimension L. All of the pistons 30 are coupled to the crankshaft 34. A crankshaft 36 is rotatably supported by main bearings B2 along the exhaust portions of the cylinders 16, in parallel alignment with the elongate dimension L. All of the pistons 32 are coupled to the crankshaft 36. Each bulkhead 13 supports a main bearing B1 on one end which supports the crankshaft 34 and a main bearing B2 on an opposite end which supports the crankshaft 36. The crankshafts 34, 36 can be coupled by a gear train 37 or by other equivalent means. The engine 10 can be referred to as a dual-crankshaft opposed-piston engine due to the presence of the two crankshafts 34 and 36. The crankcase 12 houses the crankshaft 34 and the main bearings B1. The crankcase 14 houses the crankshaft 36 and the main bearings B2. The engine structure can also include a gear box 38 housing the gear train 37.

In this specification, a "cylinder" of an opposed-piston engine is constituted of a liner (sometimes called a "sleeve") disposed in a cylinder space (sometimes called a "tunnel") defined between adjacent bulkheads of a cylinder block. Use of one or more cylinder liners ("a cylinder liner") to finish cylinders lessens manufacturing issues associated with casting of metal cylinder blocks, particularly cylinder blocks of opposed-piston engines with two crankshafts. In the opposed-piston engine of FIG. 1, each cylinder comprises a metal cylinder liner seated in a cylinder space defined between adjacent bulkheads of the cylinder block 11.

The opposed-piston engine structure shown in FIG. 1 differs fundamentally from the inline and V-type structures of conventional multi-stroke engines in which a cylinder contains only a single piston and all pistons are connected to a single crankshaft. The structural differences are especially evident when considering the challenge of fitting the multi-cylinder opposed-piston engine structure of FIG. 1 to vehicle engine compartment space configured for conventional inline and V-type engine structures. Even if not constrained by predetermined engine compartment configurations, fitting the opposed-piston engine structure of FIG. 1 to a vehicle requires creative engineering. For example, it is important to make the opposed-piston engine structure as compact as possible so as to occupy minimal engine compartment space in applications including vehicles, locomotives, maritime vessels, aircraft, stationary power sources, and so on. It is particularly desirable to reduce the center-to-center spacing between the cylinders (i. e., "bore pitch") so as to reduce the elongate dimension L of the cylinder block 11. There is, however, an impediment to this objective.

Combustion occurs in an intermediate portion of the cylinder liner when the end surfaces of pistons are near TC (i.e., "top center"—where the ends of the pistons are closest together). The high pressures and heat produced during combustion require constructions that strengthen the cylinders, especially around zones in their intermediate portions where the pistons are at or near TC. This presents challenges in cylinder block construction of opposed-piston engines that are altogether absent from a cylinder block of a conventional multi-stroke engine where the pressure and heat of combustion are contained between a piston and a cylinder head at one end of a cylinder.

In an opposed-piston engine such as is illustrated by FIG. 1, the high heat transfer to the cylinder liner near TC can force the use of complex cooling passages and/or compression bands in the intermediate portion of the cylinder liner. Another difficulty is that the cylinder liner needs water cooled bridges between the exhaust ports for high brake mean effective pressure (BMEP) applications. Some or all of these features can result in cylinder liners that are thicker (at least in their intermediate portions) than typical 4-stroke diesel engine cylinder liners. In an inline opposed-piston configuration per FIG. 1, the intermediate portions align longitudinally, and their thickness limits the extent to which L can be reduced. These features are illustrated in FIG. 2.

In FIG. 2, a cylinder liner 40 is configured with intake and exhaust ports 43 and 45, respectively. The cylinder liner 40 has a generally tubular or cylindrical shape with a longitudinal axis 47; it comprises an intermediate portion 50 between end portions 44 and 46. The cylinder liner 40 has an outer surface with a diameter which varies axially between the end portions 44 and 46. The intermediate portion 50 has a generally cylindrical shape with an outer surface diameter $D_M$ that is greater than a next largest outer diameter $D_E$ of the outer surface of the two end portions 44 and 46. In other words, the thickness of the cylinder liner 40, measured from the longitudinal axis 47 to the outer surface of the liner, varies axially such that the intermediate portion 50 is thicker than either, or both, of the end portions 44 and 46. The cylinder space in which the liner 40 is seated must accommodate the largest outside diameter $D_M$ (that is to say, the thickness) of the intermediate portion 50.

There are various reasons why the cylinder liner 40 may have a larger diameter in the intermediate portion 50 than in the end portions 44 and 46. One reason is packaging. The intermediate portion 50 has a relatively large diameter to provide the required strength and durability when subjected to the engine pressures and temperatures. However, the end portions 44 and 46 are only exposed to a small fraction of those loads, so they do not need to be as thick. Since the end portions 44 and 46 can be thinner than the intermediate portion 50, advantage is taken of that allowable cylinder block space and put to use for various purposes (e.g., oil draining, intake air chest flow area, etc.). If not located in that space, those functions would have to be packaged elsewhere in the cylinder block. Another reason is to reduce weight. Since the material at the end portions 44 and 46 is subjected to lower loads than the intermediate portion 50, less material is required for a durable part. Maintaining the large diameter throughout the cylinder liner 40 would not be an efficient use of the material and the result would be heavier than necessary.

Installation and removal of the cylinder liner 40 pose unique challenges to a cylinder block of an opposed-piston engine which are not encountered in conventional internal-combustion engines with cylinders in which a single piston reciprocates. In a conventional engine, a liner having a cylindrical sidewall surface with a generally uniform outside diameter along its length is received in a bore formed in the cylinder block. This liner is typically retained by a flange at its upper end which seats in a groove in the deck of the cylinder block where the cylinder head is attached. The flange is clamped between the cylinder head and the deck. Insertion and removal of the liner are enabled through the deck when the cylinder head is removed; insertion and removal are unencumbered by a crankcase.

In contrast, there is no cylinder head in an opposed-piston engine which can be removed to conveniently access, place, install, and/or retrieve a cylinder liner. In an opposed-piston engine embodiment comprising two crankshafts, each end of a cylinder opens to a respective one of two crankcases. Further, in multi-cylinder opposed-piston engine constructions, cylinder bore pitch can be limited if inter-cylinder spacing is based on the outside diameter $D_M$ of the intermediate portion 50 of the cylinder liner, rather than a smaller outside diameter $D_E$ of either or both of the two end portions 44 and 46. These factors have posed a problem of how to access, install, and/or remove a cylinder liner in the cylinder block of the opposed-piston engine which is not encountered in engines with a single crankshaft and a cylinder head.

One solution to this unique problem is described in the Applicant's US publication 2016/0032861, wherein the opposed-piston engine comprises a cylinder block in which adjacent bulkheads have openings which accommodate the compression band and permit closer spacing of one liner to an adjacent liner. The cylinder block is split (i.e., divided) into two sections to permit a cylinder liner to be inserted into and removed from the cylinder block. A plane of separation between the two sections runs through the intermediate portions of the cylinders, thereby affording access for a cylinder liner with a compression band. In an embodiment of this prior art solution, the plane of separation runs between the cylinder block and one of the crankcases. This construction, called "split-block", requires disassembly to separate the cylinder block and crankcase in order to access, place, and/or retrieve a cylinder liner through the cylinder block.

The split-block construction poses a number of drawbacks and difficulties. It requires a perimeter seal between the split sections to contain either coolant or crankcase oil (or both). The seal typically terminates in a T-joint, which is difficult to seal. In an opposed-piston engine with two crankshafts, in which the crankshafts are coupled by a gear train, the split-block construction adds a variable to geartrain tolerance stack-up which can influence backlash. A split-block construction increases part count with extra fasteners required around the perimeter of the split. In the case where the split occurs between one of the crankcases and the cylinder block, access to cylinder space requires handling the crankcase, a heavy, awkwardly-shaped element. Further, the mechanical coupling required to reassemble the crankcase to the cylinder block may fail to prevent movement between these elements during operation of the engine.

It is desirable to avoid the drawbacks of a split-block configuration by employing a construction in which the cylinder block and crankcases are formed (e.g., by a metal casting process) as a single, integrated, structure which includes bulkheads and walls defining cylinder tunnels and crankcase spaces. However, the forming process, especially casting, may not be able to achieve the precision necessary for forming small holes and narrow passages required for delivery and transport of liquid coolant to and through a cylinder. Thus it may be desirable to retain a liner-based cylinder construction, while avoiding the split block construction. A complete solution involves accessing cylinder space without splitting the cylinder block, and installing a liner with a thick intermediate portion into the accessed space. A novel solution to the problem of how to access cylinder space in an opposed-piston engine without splitting the cylinder block is described in co-pending, commonly-owned U.S. patent application Ser. No. 19/175,632.

The solution described in the '632 application provides access to cylinder space for a cylinder liner having a diameter $D_M$ in its intermediate portion that is greater than a next-largest outer diameter $D_E$ of either or both of its two end portions in a cylinder block of an opposed-piston engine. A unique main bearing device can be detached, in its entirety, from a bulkhead, and removed from the crankcase in order to provide access to cylinder space. The space is closed when the main bearing device is reattached to the bulkhead.

Access through the crankcase is provided by way of an aperture between complementarily-scalloped portions of two adjacent bulkheads that flank and define a cylinder space shaped to receive the cylinder liner. In the absence of main bearing devices on the bulkheads, the scalloping defines and provides an unobstructed aperture at (in or near) the crankcase that is large enough to allow passage of the large diameter of the intermediate portion of the cylinder liner through a crankcase of the cylinder block, without splitting the cylinder block. When assembled to the bulkheads, the main bearing devices overlay part of the complementary scalloping, thereby obstructing (effectively, blocking) the aperture.

With provision of access to cylinder space through a crankcase of an opposed-piston engine such as is afforded by the main bearing device described in the '632 application, it becomes necessary to provide a complete solution to the problem of how to retain a cylinder liner in the cylinder block of the opposed-piston engine in a manner that can integrate well and effectively with the construction of the engine, while minimizing undesirable effects of cost, complexity, and reduced performance.

SUMMARY

This specification relates to an opposed-piston engine and, more particularly, to combinations of devices provided for seating and retention of a cylinder liner in the cylinder block of an opposed-piston engine with a crankshaft. The specification contemplates a cylinder liner configured to be received in a cylinder space of the cylinder block, a main bearing device comprising a complete cylindrical bearing recess configured to seat against the cylinder block, over the cylinder space, and a clamping assembly configured to act between the cylinder liner and the main bearing device to clamp the cylinder liner to the cylinder block in response to assembly of the main bearing device with the cylinder block. The clamping assembly thereby enables the seating and retention of a cylinder liner installed in the opposed-piston engine without splitting the cylinder block or detaching a crankcase therefrom.

BRIEF DESCRIPTION OF DRAWINGS

FIGS. 4A and 4B are views into a crankcase of the cylinder block of FIG. 3.

DETAILED DESCRIPTION

Figure 1:
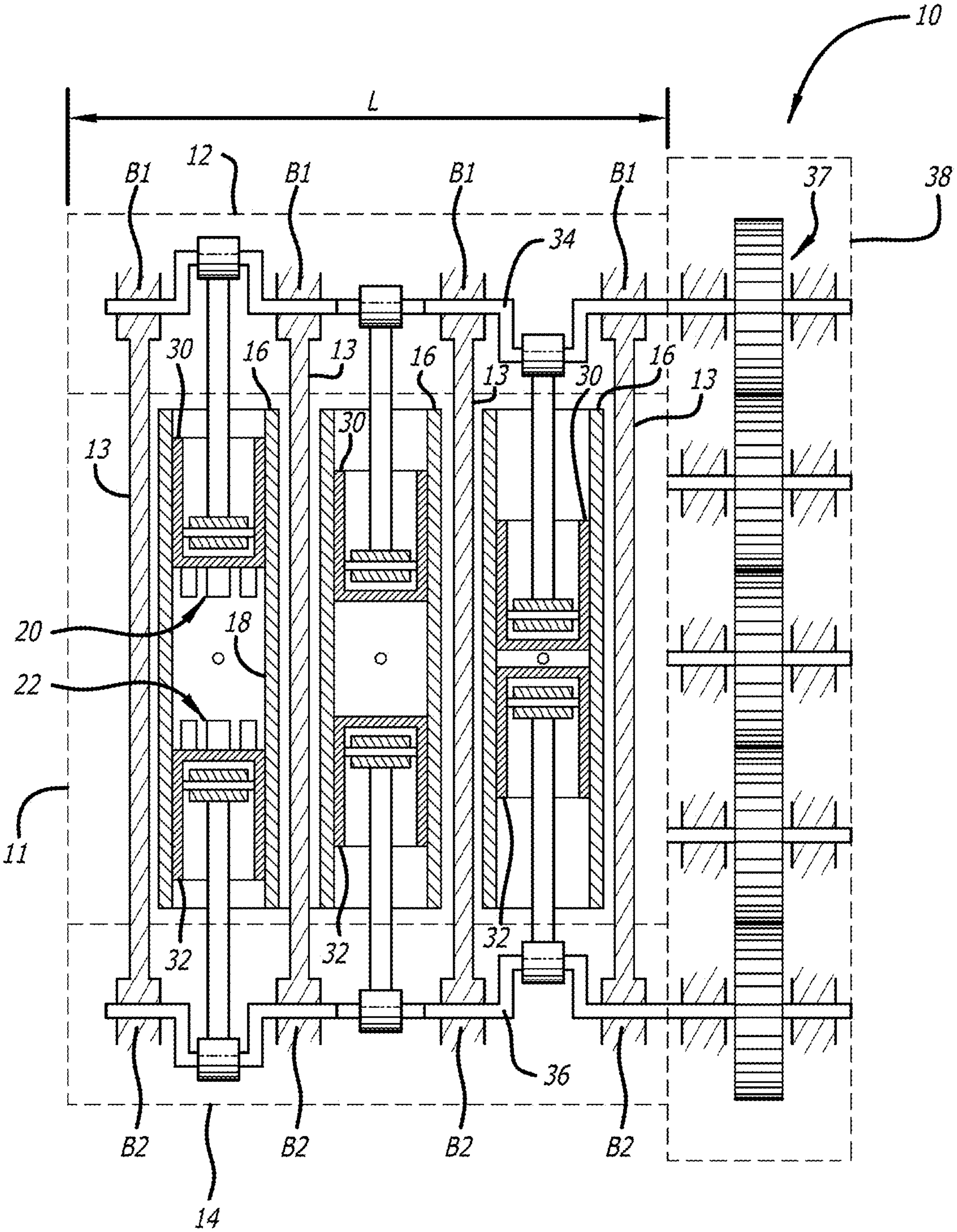
FIG. 1 (Prior Art)
FIG. 1 schematically illustrates a cylinder block of an opposed-piston engine, and is appropriately labeled "Prior Art".
Figure 2:
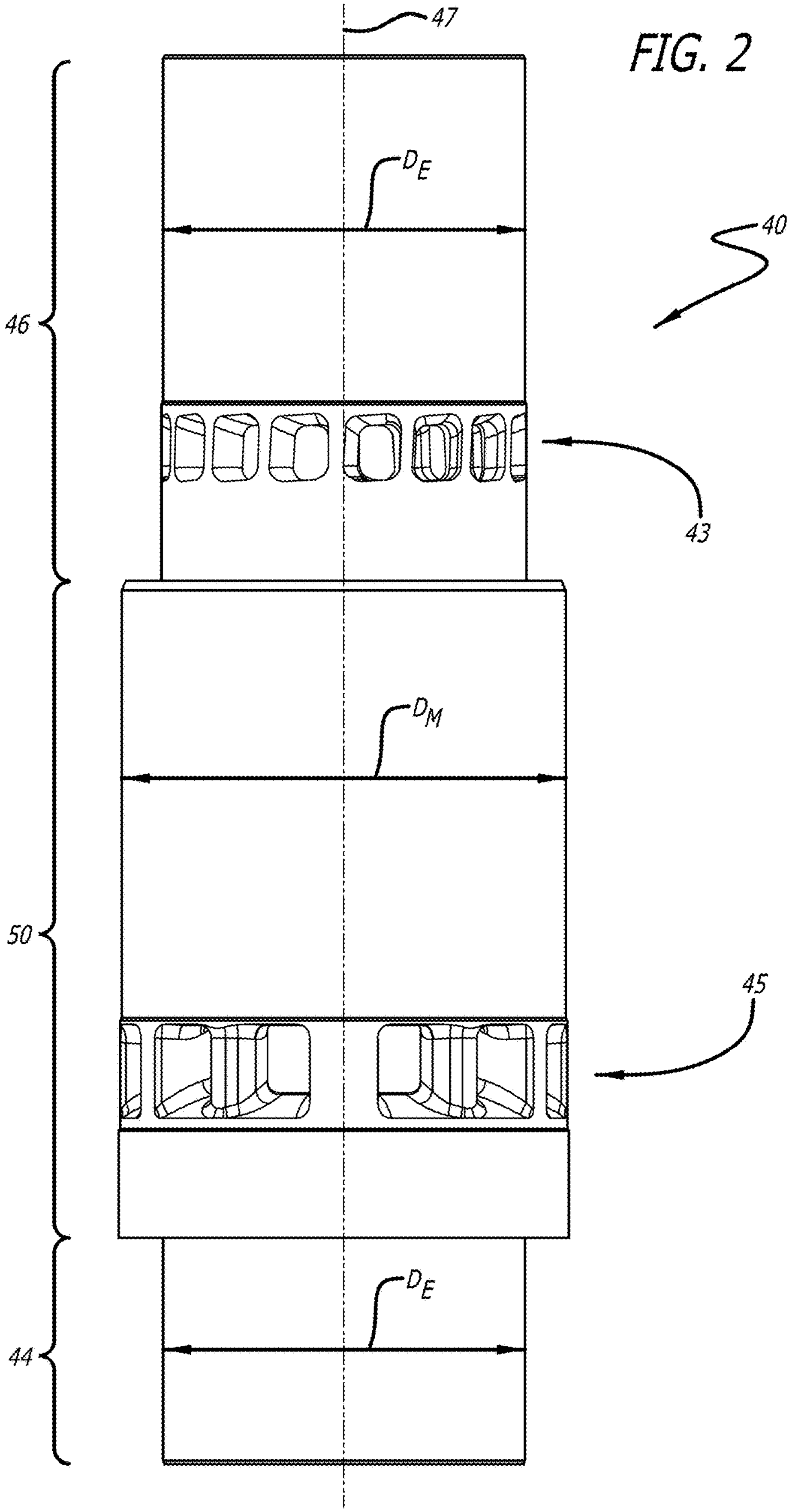
FIG. 2 illustrates a cylinder liner of an opposed-piston engine.
Figure 3:
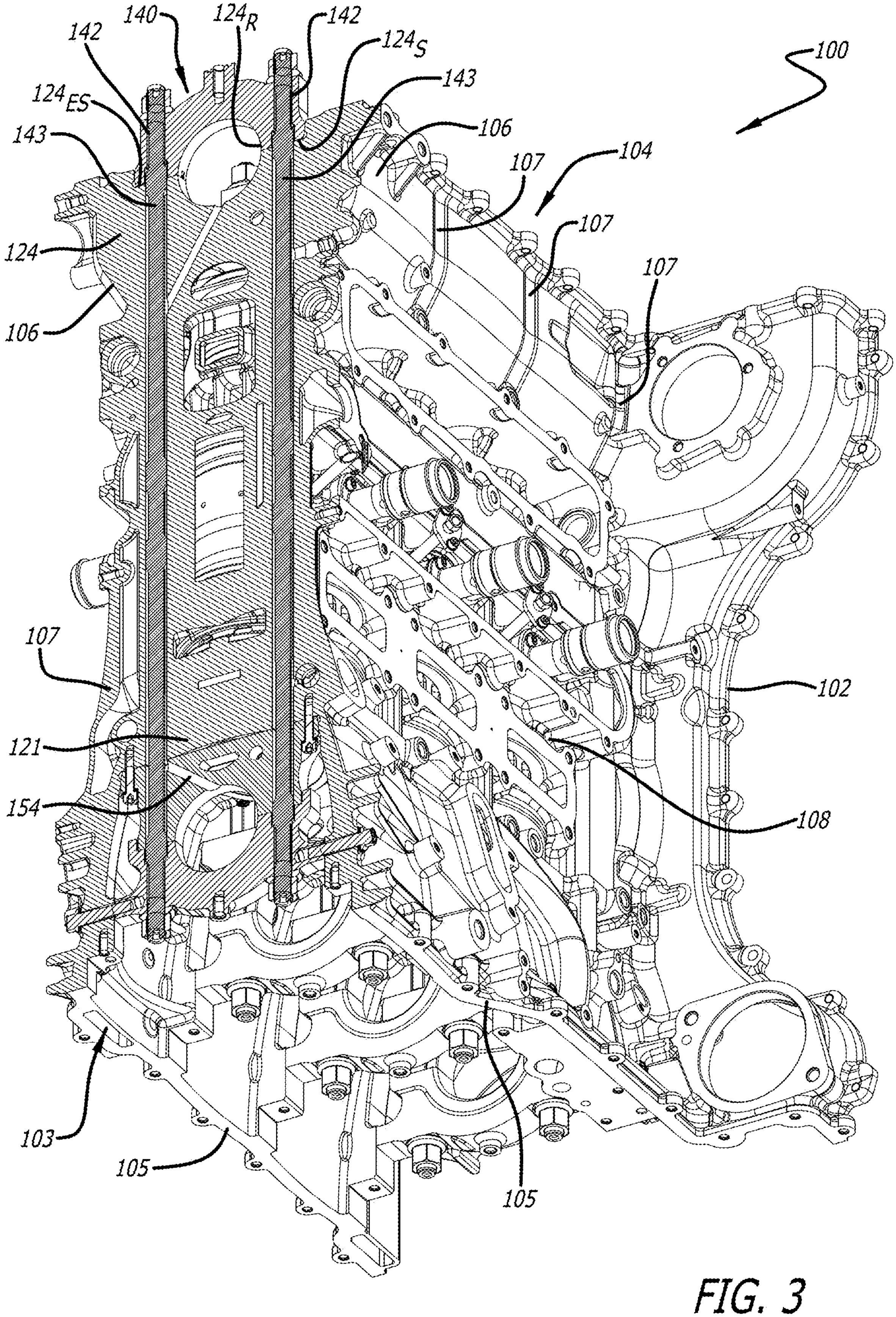
FIG. 3 is a perspective view partially in cross-section of a cylinder block of an opposed-piston engine showing a configuration of devices provided for seating and retention of a cylinder liner in the cylinder block.
Figure 5:
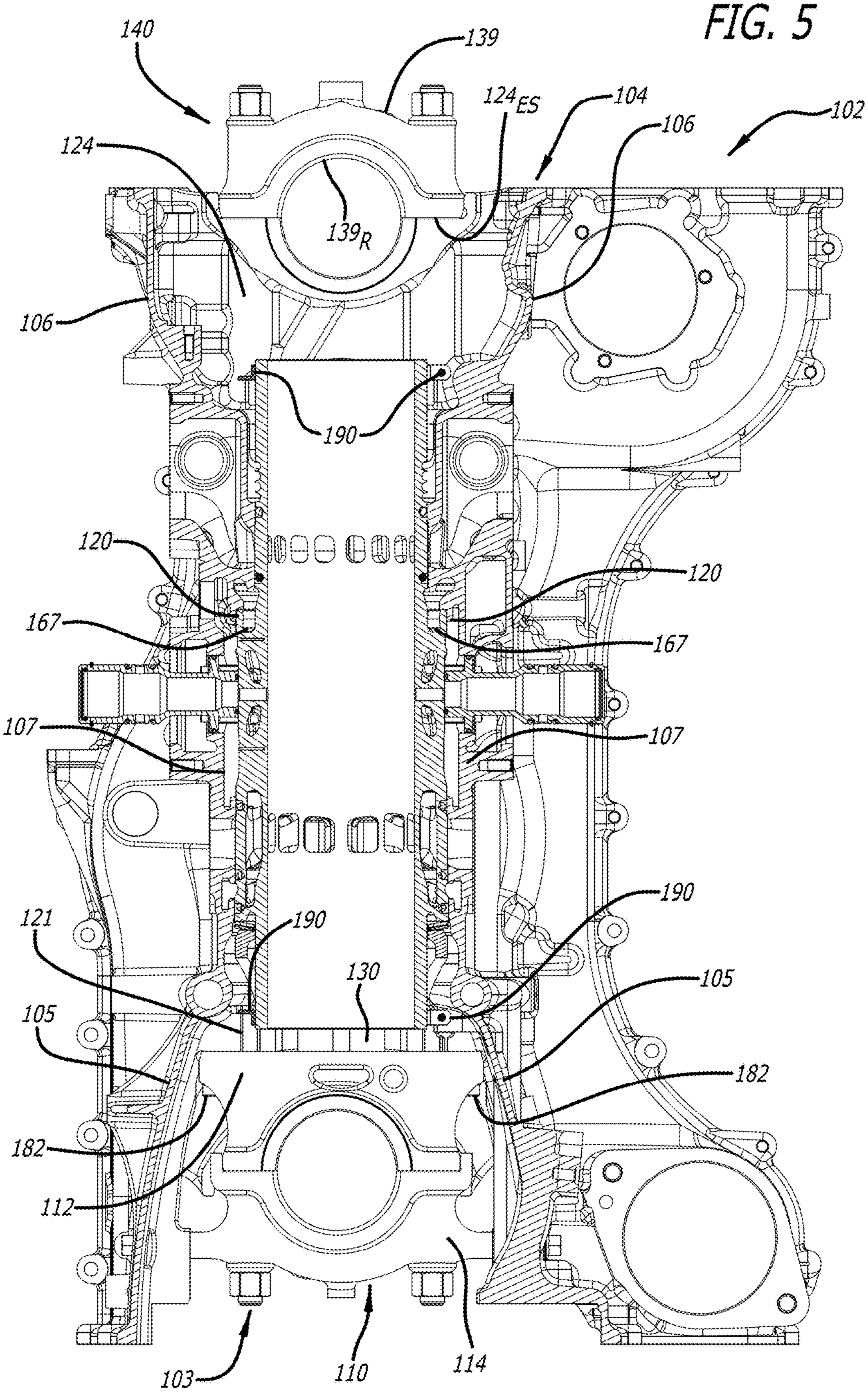
FIG. 5 is a side elevation view partially in cross-section of the cylinder block of FIG. 3 showing placement and seating of the cylinder liner in the cylinder block.

With regard to FIGS. 3-5, a dual-crankshaft embodiment of an opposed-piston engine is generally indicated by 100. The engine 100 can be configured for one or more cylinders; a representative embodiment for this specification includes three cylinders. The engine 100 comprises a cylinder block 102, including first and second crankcases 103 and 104, formed as a single, integrated unit (e.g., by casting). Each crankcase is configured to carry one crankshaft (not shown). The crankcase 103 is defined by longitudinally extending walls 105 and the crankcase 104 is defined by longitudinally extending walls 106. Bulkheads 107 connect sidewalls 108 of the cylinder block 102 and extend between the crankcases 103 and 104. A bulkhead 107 has a first end portion 121 situated at the crankcase 103 and a second end portion 124 situated at the crankcase 104.

Per FIGS. 3 and 4A, the first end portion 121 of the bulkhead 107 is shaped by scalloping 130 which extends longitudinally on the bulkhead 107 from an end surface $\mathbf{121}_{ES}$ of the first end portion 121 to a stopping shoulder 120 (best seen in FIG. 5) on an inner diameter of the cylinder block 102, or more precisely, on an interior portion of the bulkhead 107. Both sides of the bulkhead end portion 121 can be scalloped in this manner. A concave trench defined by the scalloping 130 can have a partially-circular cross-sectional shape characterized by an effective diameter sufficient to permit the diameter $D_M$ of the intermediate portion of a cylinder liner such as the cylinder liner 40 to be received in cylinder space formed in part by the bulkhead 107. From another aspect, the scalloping 130 of an end portion 121 forms at least a portion of a generally circular aperture through the crankcase 103 into a generally cylindrical space configured to receive a cylinder liner with a thickened intermediate portion, like the cylinder liner 40. As per FIG. 4A, two complementarily-scalloped end portions 121 of two adjacent bulkheads 107 flank and define the generally circular aperture. Although a generally circular aperture is preferred, the complementary shaping of the bulkhead end portions 121 can define an aperture of any shape that enables clearance of the thickened intermediate portion of a cylinder liner.

It is not necessary that both end portions 121 and 124 of a bulkhead be similarly configured. As seen in FIG. 3, for example, an end surface $\mathbf{124}_S$ of the second end portion 124 can be shaped by a semi-cylindrical bearing recess $\mathbf{124}_R$.

Referring to FIGS. 3 and 5, main bearing devices 110 disposed in crankcase space of crankcase 103 retain a first crankshaft (not shown) on the cylinder block 102 and permit the first crankshaft to rotate. Each main bearing device 110 receives a main journal of the first crankshaft. Main bearings 140 disposed in crankcase space of crankcase 104 retain a second crankshaft (not shown) on the cylinder block 102 and permit the crankshaft to rotate. Each main bearing 140 receives a main journal of a second crankshaft.

Figure 6:
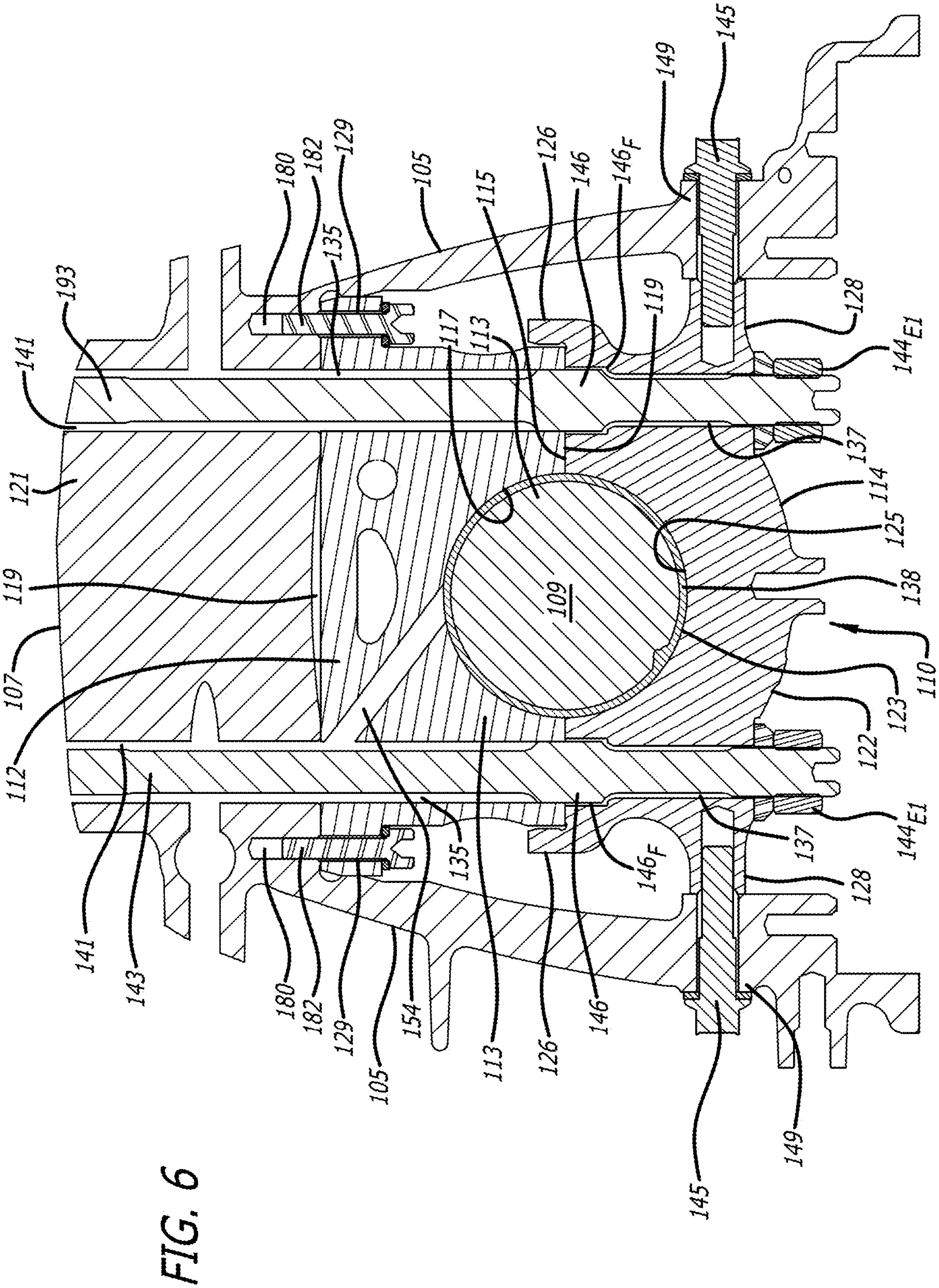
FIG. 6 is a front elevation view in cross-section of a portion of the crankcase showing a main bearing device assembled to a bulkhead of the cylinder block.

Construction details of a main bearing device are described in the '632 application. FIGS. 3, 5, and 6 illustrate a main bearing device 110 according to the '632 application, with additional features which configure the main bearing device 110 for use according to this specification. According to FIG. 6, a main bearing device 110 comprises a saddle piece 112 and a cap piece 114. The saddle piece 112 has a receiving surface 115 with a semi-cylindrical bearing recess 117. Opposing sides of the saddle piece 112 curve inwardly to form legs on each side of the semi-cylindrical bearing recess 117. A rectangularly shaped attachment surface 119 (seen in FIGS. 6 and 9) extends across a base of the of the saddle piece 112, opposite the receiving surface 115. The attachment surface 119 is configured to be attached to, and retained on, an end portion 121 of the bulkhead 107. The cap piece 114 has a top surface 122 and an opposite seating surface 123. The seating surface 123 comprises a semi-cylindrical bearing recess 125 flanked by vertical shoulders 126 at respective ends of the seating surface 123. The seating surface 123 is received on the receiving surface 115, with the legs 113 situated inside the shoulders 126. In this manner, the semi-cylindrical bearing recesses 117 and 125 can be aligned to define a cylindrical bearing recess 127. Bosses 128 project laterally from opposite sides of the cap piece 114. Through bores 129 running longitudinally through the saddle piece 112 open through the attachment surface 119 near respective ends thereof. Stud insertion holes 135 run, in parallel, through the saddle piece 112 from the receiving surface 115 to the attachment surface 119. A stud insertion hole 135 is provided on each side of the first semi-cylindrical bearing recess 117 beside a respective through bore. Stud insertion holes 137 run, in parallel, through the cap piece 114 from the seating surface 123 to the top surface 122. A stud insertion hole 137 is provided on each side of the second semi-cylindrical bearing recess 125.

Figure 9:
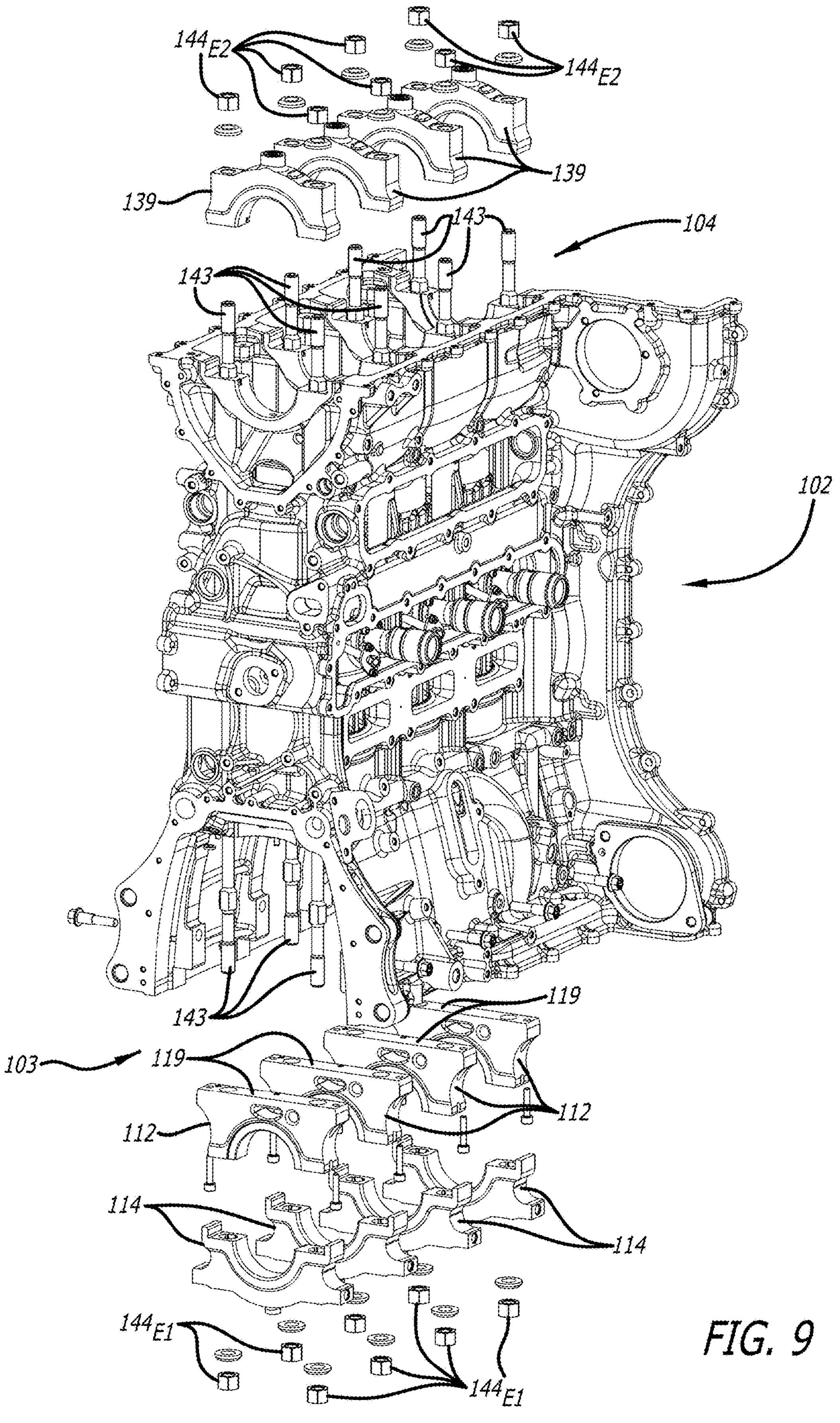
FIG. 9 is an exploded perspective view of the cylinder block of FIG. 3 illustrating assembly of main bearing pieces thereto.
Figure 10:
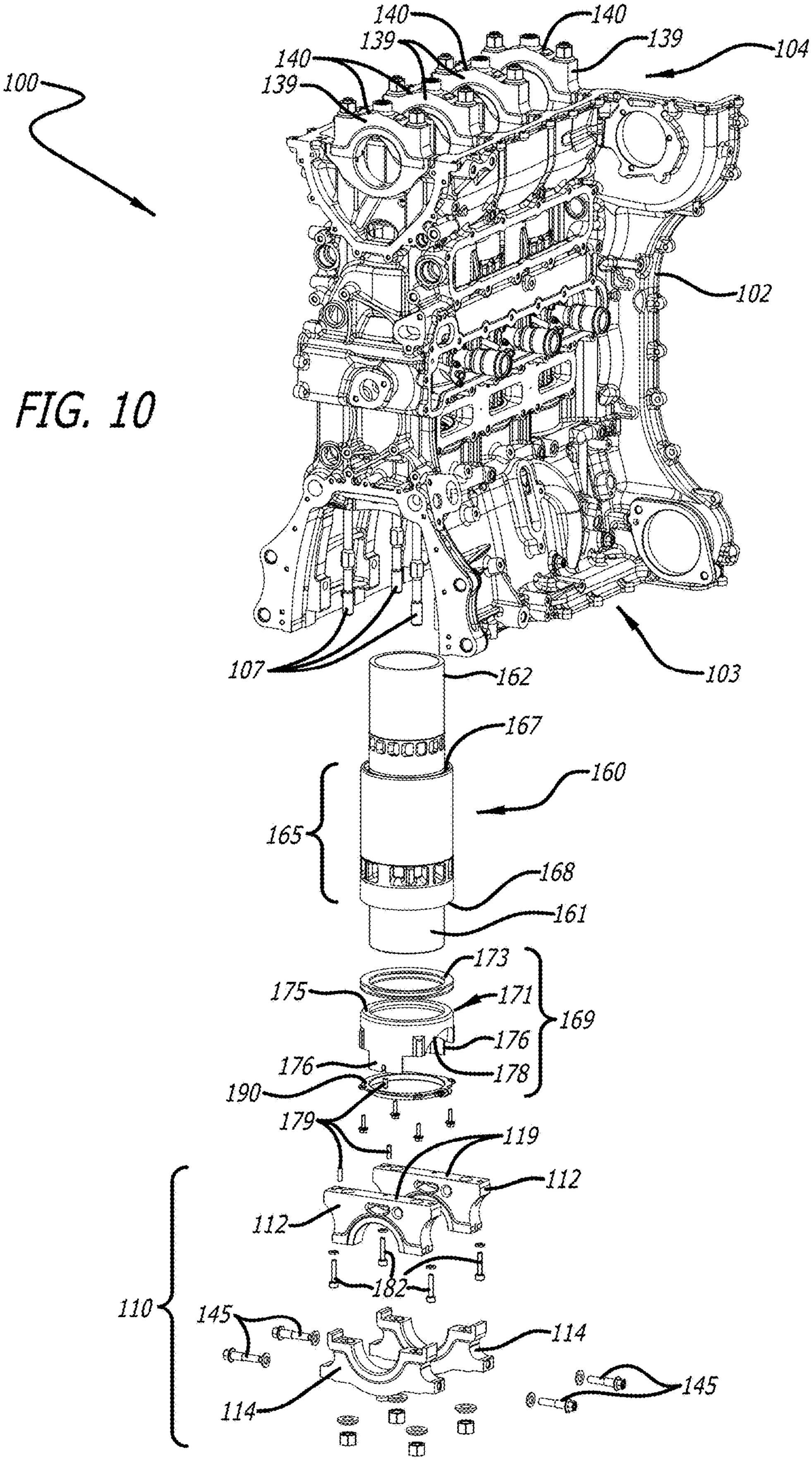
FIG. 10 is an exploded perspective view of the cylinder block of FIG. 3 showing the configuration and arrangement of devices provided for installation of the cylinder liner in the cylinder block.
Figure 11:
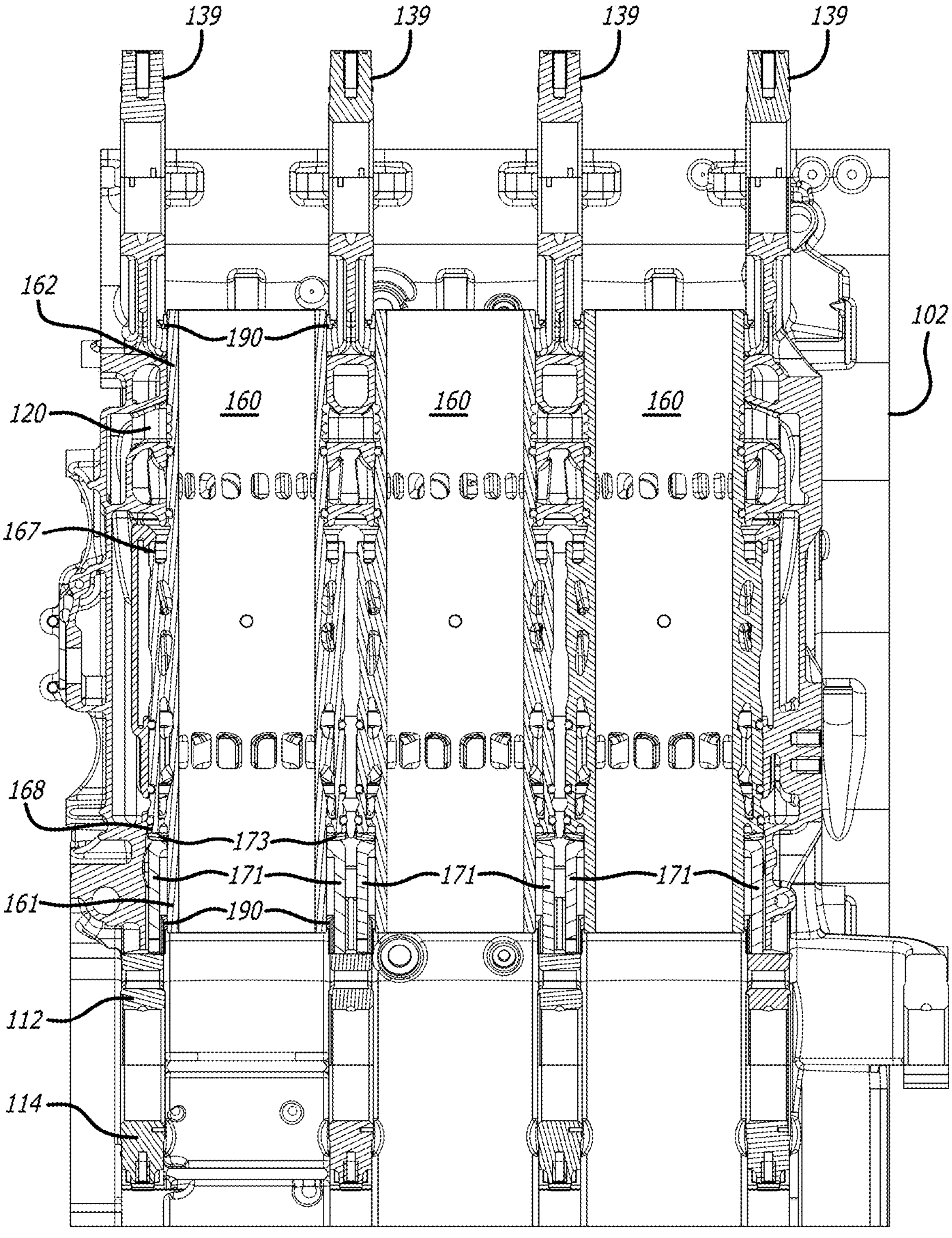
FIG. 11 is a side elevation view partially in cross-section of the cylinder block of FIG. 3 with three cylinder liners installed therein.

With reference to FIGS. 9 and 10, the attachment surface 119 of the saddle piece 112 can comprise an essentially flat, planar area with a generally rectangular shape. As per the view into the crankcase 103 seen in FIGS. 4A and 4B, the shape of the attachment surface 119 configures the saddle piece, and thus the main bearing device 110, to overlay the scalloping 130 of the end portions 121 of the bulkheads 107. Cylinder spaces are defined in the cylinder block 102 between pairs of the bulkheads 107. Each end portion 121 of each bulkhead 107 can have at least one scalloped side; in the embodiment illustrated in FIGS. 4A and 4B, scalloping 130 is provided on each side of each end portion 121. The scallopings 130 of adjacent bulkheads 107 are complementary in that they partially define a generally circular aperture 204 a diameter of at least $D_M$. As seen in FIG. 4B, a main bearing device 110 can be assembled to each end portion 121. When a main bearing device 110 overlays an end portion 121, the portion of the generally circular aperture 204 formed by scalloping 130 is obstructed or blocked, thereby adapting the main bearing device 110 to retain a cylinder liner in the cylinder space defined between adjacent bulkheads 107.

Figure 7:
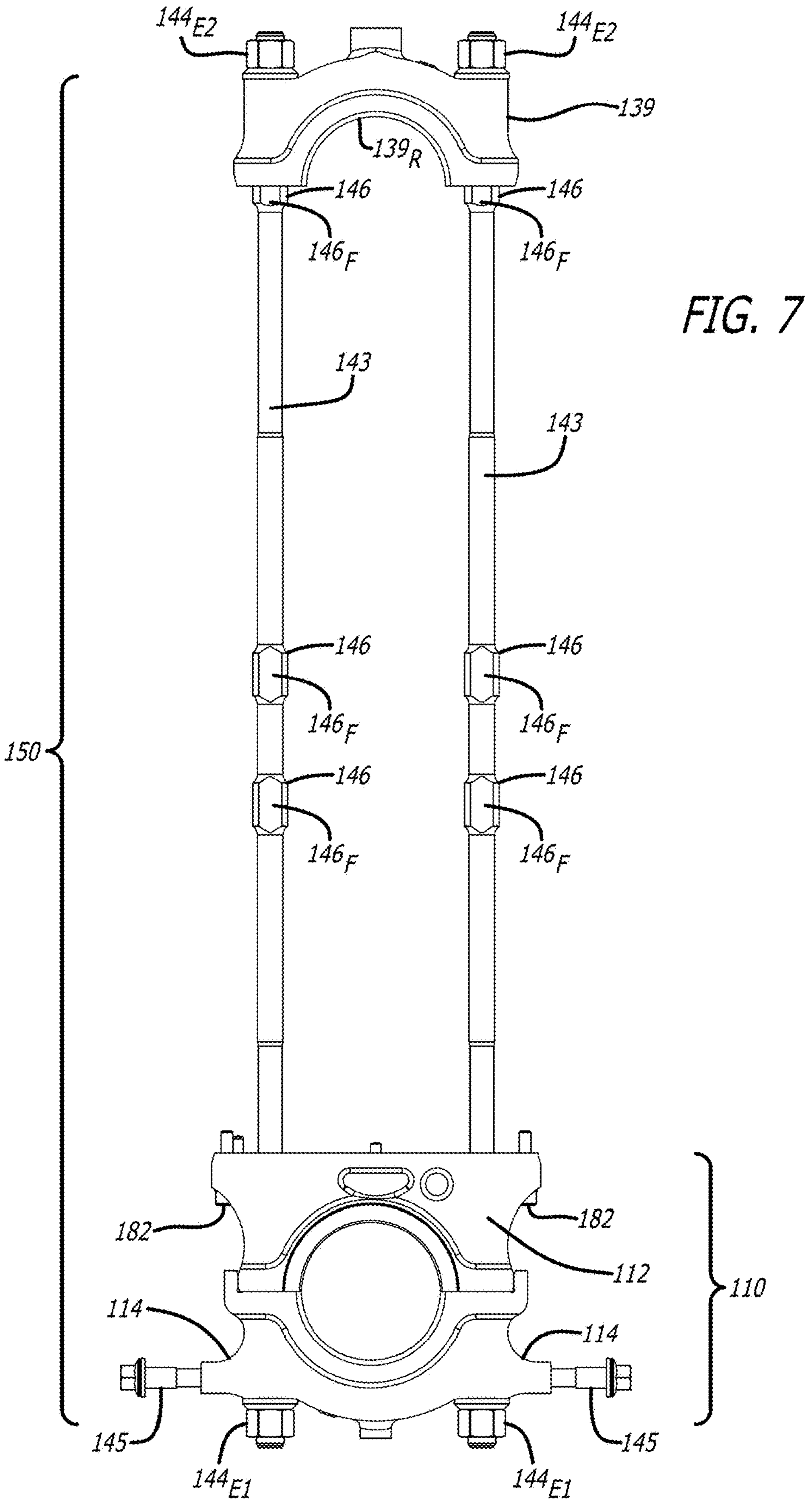
FIG. 7 is a front elevation view of a fastening assembly for fastening main bearing elements to the cylinder block of FIG. 3.

According to FIGS. 3, 6, and 7, a main bearing device 110 can be assembled to the cylinder block 102. In this regard, a main bearing device 110 is assembled to the scalloped end portion 121 of a bulkhead 107 in the first crankcase 103, with the attachment surface 119 of the saddle piece 112 contacting the end surface $\mathbf{121}_{ES}$ of the end portion 121, and the seating surface 123 of the cap piece 114 contacting the receiving surface 115 of the saddle piece 112. In this example, the first semi-cylindrical bearing recess 117 and the second semi-cylindrical bearing recess 125 align to define the cylindrical bearing recess 127. The cylindrical bearing recess 127 can be configured to receive a bearing shell (also, "race") 138, whereby it can accommodate and retain a main journal 109.

Per FIGS. 3 and 5, a main bearing 140 in the second crankcase 104 comprises a main bearing cap 139 including a semi-cylindrical bearing recess $\mathbf{139}_R$ received on the end surface $\mathbf{124}_{ES}$ of the second end portion 124 such that the semi-cylindrical bearing recess $\mathbf{139}_R$ is in alignment with the semi-cylindrical bearing recess $\mathbf{124}_R$. The semi-cylindrical bearing recess of a main bearing cap is flanked by stud insertion holes 142.

Per FIGS. 3, 6, 7, and 10 a plurality of fasteners (e.g., studs) are provided to join the saddle piece 112 with the cap piece 114 and assemble the main bearing device 110 to the cylinder block 102 when the attachment surface 119 is received on the scalloped end portion 121 of a bulkhead 107. The same fasteners also assemble the main bearing cap 139 to the end surface $\mathbf{124}_{ES}$ of the bulkhead 124. Preferably, a fastening assembly 150 serving both purposes can be provided for each bulkhead 107. The fastening assembly includes through studs 143 coupled to a main bearing device 110 and to a main bearing cap 139. The through studs 143 comprise solid cylindrical devices. The main bearing device 110 is assembled by aligning the stud insertion holes 135 and 137 with each other and with generally parallel, spaced-apart passageways 141 that extend through the bulkhead 107 from the first crankcase 103 to the second crankcase 104. A plurality of through studs can be provided to join the saddle piece 112 with the cap piece 114 and to assemble the joined saddle piece and cap piece to the cylinder block 102. For example, two through studs 143 can be configured to pass through the stud insertion holes 135, the stud insertion holes 137, and through the bulkhead 107 via the passageways 141, with a through stud 143 on each side of the cylindrical bearing recess 127, and to pass from the passageways 141 through the stud insertion holes 142 in the main bearing cap $\mathbf{139}_{CAP}$, with a through stud on each side of the semi-cylindrical bearing recess $\mathbf{139}_R$. First ends $\mathbf{143}_{E1}$ of the through studs 143 are threaded so as to be coupled to the cap piece 114 by threaded nuts $\mathbf{144}_{E1}$. Second ends $\mathbf{143}_{E2}$ Of the through studs 143 are threaded so as to be coupled to the main bearing cap $\mathbf{139}_{CAP}$ by nuts $\mathbf{144}_{E2}$.

The fastening assembly 150 is configured to maintain the cylinder block 102 in compression during operation of the engine 100. Carrying the tensile load via the through studs is desirable because of their superior tensile load carrying capacity compared to the bulkhead material itself. The material of the cylinder block 102 (and thus, of the bulkheads) is metal, preferably cast iron, but could alternatively be cast aluminum. Neither of those materials has a very high tensile strength. Tensile forces from combustion are transferred from pistons into the crankshafts and main bearing caps. If a fastener arrangement assembling each main cap to the cylinder block is used, these forces (and gear separation forces) will transfer to the cylinder block 102, undesirably subjecting it to high tensile forces. Through studs can comprise high strength steel with a tensile strength of ~4× that of cast iron. Thus, the fastening assembly 150, with through studs 143 of high strength steel which assemble main bearing elements of both crankcases, can maintain cylinder block 102 in compression, from the crankcase 103 to the crankcase 104, during operation of the engine 100 since the tensile loads from combustion are carried by the through studs.

Figure 8:
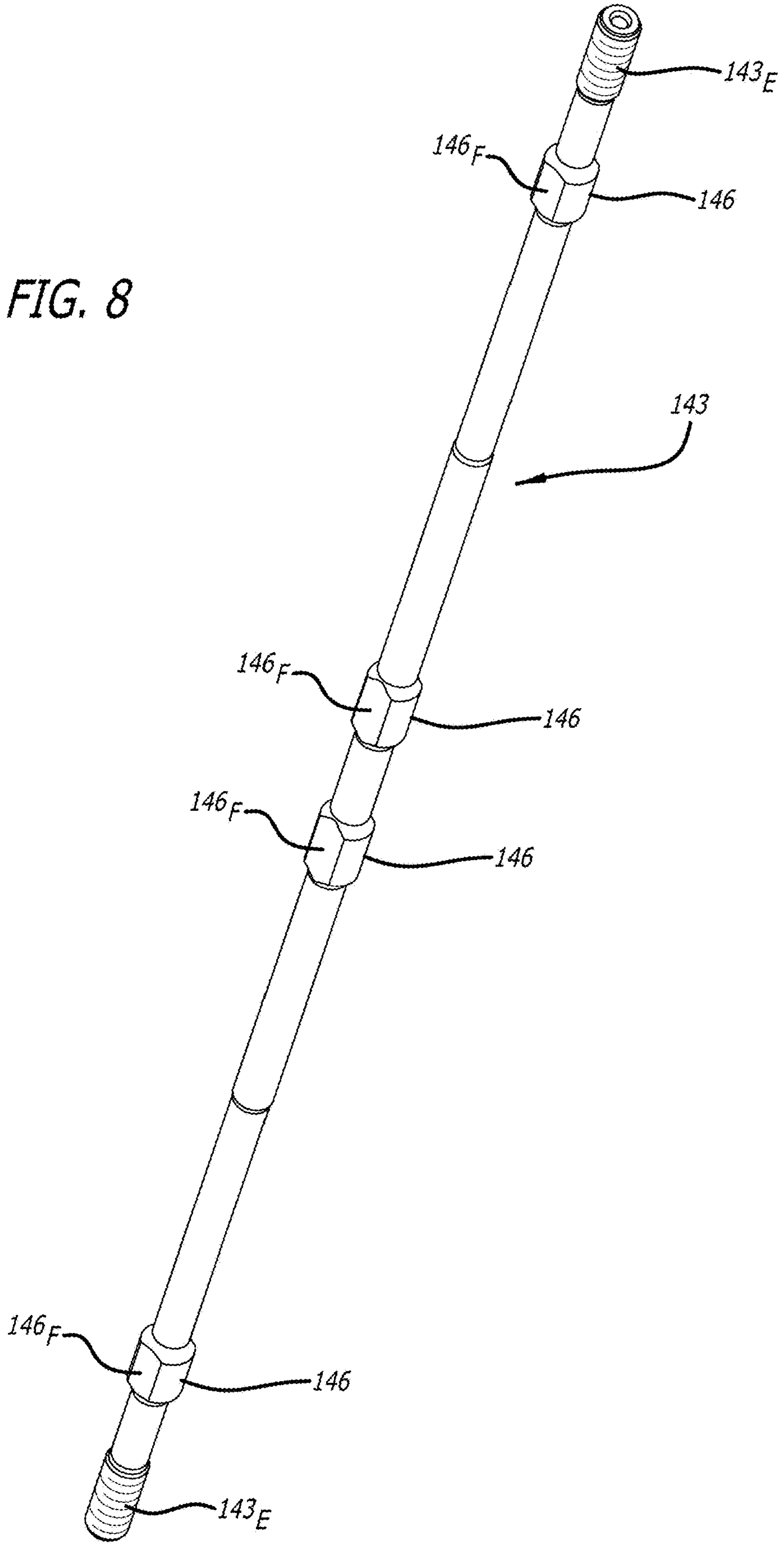
FIG. 8 is a perspective view of a through stud of the fastening assembly of FIG. 7.

As per FIGS. 6, 7, and 8 a through stud 143 can be an elongate high strength steel shaft having a generally solid cylindrical shape, which is threaded at each end $\mathbf{143}_E$. The body of each through stud 143 can comprise one or more shoulder portions 146 to align, orient, position, seat and/or stabilize the through stud 143 itself within the cylinder block 102 and/or the main bearing components (e.g. the main bearing device 110 and the main bearing cap $\mathbf{139}_{CAP}$) with which it is coupled. A shoulder portion 146 has axially-extending, generally solid cylindrical shape, with opposing rounded sides and opposing flattened sides $\mathbf{146}_F$. The nominal diameter of a shoulder portion 146 is slightly greater than the nominal diameter of the body of the through stud 143, and is sized to slidably engage a passageway 141 in the cylinder block 102 and aligned stud insertion holes in the main bearing device 110 and the main bearing cap $\mathbf{140}_{CAP}$. The opposing rounded sections of the innermost shoulder portions 146 serve to stabilize the midsection of the through stud 143 against vibration during operation of the engine. The passageways 141 in the cylinder block 102 are configured to conduct fluid, and the opposing flat sides $\mathbf{146}_F$ provide openings between the shoulder portions 146 and the passageways through which effluent can pass. In order to enable lubrication of the main bearing device 110, the saddle piece 112 can comprise a passageway 154 to transport oil to the cylindrical bearing recess 127 from a passageway 141.

Referring now to FIGS. 5, 6, 10, and 11, with the through studs 143 installed in the cylinder block 102, a cylinder liner 160 can be installed in a cylinder space defined in the cylinder block 102. The cylinder liner 160 has a longitudinal aspect extending along an axis between a first end portion 161 and a second end portion 162 and comprises a generally cylindrical intermediate portion 165. The outer surface of the intermediate portion 165 has a diameter $D_M$ that is greater than a next largest outer diameter $D_E$ of the outer surface of either or each of two end portions 161 and 162 of the cylinder liner 160. The transitions or steps between the larger diameter of the intermediate portion 165 and the smaller diameter (or, diameters) of the end portions 161 and 162 form rims which can provide midstops with which the cylinder liner 160 may be located in, and/or clamped to, the cylinder block 102. In this regard, a first rim of the intermediate portion 165 defines a first midstop 167 of the cylinder liner 160 and a second rim of the intermediate portion 165 defines second midstop 168 of the cylinder liner 160.

The cylinder liner 160 is inserted into the cylinder block 102, by being slid through a generally circular aperture defined by scalloped end portions 121 (FIG. 4A) of adjacent bulkheads 107. In this manner, the cylinder liner 160 can be said to have been inserted into the cylinder block 102 through the crankcase 103, without splitting the block or detaching the crankcase therefrom. Once inserted, the cylinder liner 160 is axially located in a cylinder space between adjacent bulkheads 107 by engagement between the first midstop 167 and the stopping shoulder 120 on an inner diameter of the cylinder block 102. With the cylinder liner 160 axially located, the rim of the end portion 161 is situated axially inwardly of the end surfaces $\mathbf{107}_{ES}$ of the adjacent bulkheads 107, while the diameter $D_E$ of the end portion 161 is located in cylinder space shaped for the larger diameter $D_M$ of the intermediate portion 165.

A clamping assembly 169 acts between the cylinder liner 160 and a main bearing device 110. The clamping assembly 169 can be disposed in abutment with the second midstop 168 of the cylinder liner 160 so as to clamp the cylinder liner to the cylinder block 102 in response to assembly of the main bearing device 110 to the first end portion 121 of a bulkhead 107. The clamping assembly 169 comprises a clamping ring 171 and may additionally comprise a biasing device 173; it acts against the second midstop 168 of the cylinder liner 160. The clamping ring 171 has an annular body with a circular rim 175 with an inner marginal diameter substantially equal to $D_E$ of the end portion 161 of the cylinder liner 160 and an outer marginal diameter substantially equal to the larger diameter $D_M$ of the intermediate portion 165. The annular body of the clamping ring 171 transitions axially to a pair of radially opposing legs 176 defining opposing arches 178 which distribute pressure felt by the rim 171 to the legs 176. The biasing device 173 can comprise a Belleville device (e.g. a Belleville spring or washer stack) having an inner marginal diameter substantially equal to $D_E$ of the end portion 161 and an outer marginal diameter substantially equal to the larger diameter $D_M$ of the intermediate portion 165. The Belleville device can be sized to fit slidably to the end portion 161 of the cylinder liner 160 where it is urged against the second midstop 168 by the circular rim 175 of the clamping ring 171. The legs 176 of the clamping ring 171 protrude slightly through the generally circular aperture 204 defined by the complementarily-scalloped bulkhead end portions 121 to contact the attachment surfaces 119. The legs 176 are aligned with the attachment surfaces 119 by dowels 179, and the saddle portions 112 are received on the first ends $\mathbf{143}_E$ of the through studs 143 and bolted to the cylinder block by side bolts 182 threaded into threaded bores 180 formed in the crankcase walls 105.

Once the cylinder liner 160 is received and located in the cylinder space, the clamping assembly 169 is slidably positioned within the generally circular aperture formed by the complementarily-scalloped sides of the adjacent bulkheads 107. There, the clamping assembly 169 is secured by placing each saddle 112 against a bulkhead end surface $\mathbf{121}_{ES}$ and tightening the side bolts 182, which forces the saddles 112 against the legs 176 of clamping assembly 169. With both saddles 112 made fast by tightening the side bolts 182, the clamping assembly 169 pushes against the second midstop 168, whereby the cylinder liner 160 is clamped to the cylinder block 102. The biasing device 173 ensures the cylinder liner 160 is well positioned for completion of cylinder block assembly. Through studs 143 provide additional clamp load at a bulkhead end surface $\mathbf{121}_{ES}$ when tightened, but do not change the load through the cylinder liner 160 or the position of the cylinder liner beyond whatever results may occur from the distortion of the bulkhead end surface $\mathbf{121}_{ES}$.

The described mode of clamping the cylinder liner 160 reduces the risk of external forces distorting the inside diameter of the cylinder liner 160 (i.e., the cylinder bore) in the event that the loads are not uniform, are too high, or if the cylinder liner 160 is not stiff enough. Such distortion can lead to compromised ring seal or piston scuffing in an extreme case. Use of a biasing device in the clamping assembly 169 keeps the loads uniform, even when thermal growth occurs. In this regard, the biasing device pushes on the second midstop 168 at one end of the larger diameter of the intermediate portion 165 of the cylinder liner 160. The reaction force produced thereby on the cylinder liner 160 urges the first midstop 167 against the stopping shoulder 120 in the cylinder block 102 at the other end of the intermediate portion 165, thus clamping the cylinder liner 160 against the cylinder block 102.

The fastening assemblies 150 can be fitted together as per FIGS. 7 and 9, thereby completing assembly of the main bearing devices 110 and the main bearing caps $\mathbf{139}_{CAP}$ to the cylinder block 102. The nuts $\mathbf{144}_{E1}$ and the nuts $\mathbf{144}_{E2}$ are tightened to achieve the desired compressive force over the cylinder block.

As best seen in FIGS. 6 and 10, cross-bolts configured to act between a main bearing device 110 and the opposing walls 105 of the first crankcase 103 can be provided to stabilize the main bearing device 110 in the crankcase. Relatedly, a cross-bolt is a bolt retaining a bearing piece on a side of a crankshaft main journal that is oriented in a direction generally perpendicular to the axis of the crankshaft. Cross-bolts 145 can be provided in the crankcase cavity formed between the opposing sidewalls 105. In such embodiments, laterally-oriented, oppositely-directed bosses 147 with threaded bores can be provided on opposing sidewalls of the cap piece 114, which extend toward the opposing sidewalls 105 of the crankcase, where they can be aligned with complementary bosses 149 formed in the crankcase sidewalls. Configuration of the cross-bolts 145 can include threading their ends, which can be inserted through the complementary bosses and tightened into the threaded bores of the bosses 147 of the cap piece 114.

As best seen in FIGS. 5 and 10 stabilizing collars 190 can be utilized to prevent radial movement of the end portions 161 and 162 of a cylinder liner 160 during operation of the opposed-piston engine. As per FIG. 10, multi-cylinder embodiments of the opposed-piston engine can require sharing of attachment surfaces 119 of saddle portions 112 by two clamping rings 171.

Changes to, variations on, and/or adaptations of the disclosed embodiments may occur to a person having reasonable skill in the art of opposed-piston engines without departing from its scope and spirit, which is defined in the following claims.

The invention claimed is:

1. An opposed-piston engine, comprising:

a cylinder block comprising a first crankcase configured to receive a first crankshaft, a second crankcase configured to receive a second crankshaft, and a bulkhead extending between the first crankcase and the second crankcase;

the bulkhead comprising a first end portion situated at the first crankcase and configured to at least partially define a cylinder space in the cylinder block and a second end portion situated at the second crankcase and configured to support a journal of the second crankshaft;

a cylinder liner received in the cylinder space;

a main bearing device comprising a cylindrical bearing recess configured to support a journal of the first crankshaft and an attachment surface configured to be attached to the first end portion; and, a clamping assembly configured to act between the cylinder liner and the main bearing device so as to clamp the cylinder liner against the cylinder block.

2. The opposed-piston engine of claim 1, further comprising a pair of through studs received in the bulkhead and configured to assemble the main bearing device to the first end portion and to assemble a main bearing cap to the second end portion.

3. The opposed-piston engine of claim 2, in which the clamping assembly comprises a clamp configured to act between the main bearing device and the cylinder liner and a biasing device situated between the clamp and the cylinder liner and configured to bias the cylinder liner against the cylinder block.

4. The opposed-piston engine of claim 3, in which the clamp comprises an annular body with a circular rim which transitions to a pair of radially opposing legs that define opposing arches.

5. The opposed-piston engine of claim 3, in which the biasing device comprises a Belleville device.

6. The opposed-piston engine of claim 1, in which the cylinder liner comprises an intermediate portion with an outer diameter $D_M$ that is greater than a next largest outer diameter $D_E$ of the outer surface of either or each of the two end portions.

7. The opposed-piston engine of claim 6, in which the first end portion of the bulkhead is scalloped to at least partially define an aperture into the cylinder space.

8. The opposed-piston engine of claim 7, in which the scalloped first end portion comprises a concave trench having a partially-circular cross-sectional shape characterized by an effective diameter sufficient to permit the diameter $D_M$ of the intermediate portion of a cylinder liner to be received in the cylinder space.

9. The opposed-piston engine of claim 7, in which a portion of the aperture into the cylinder space is obstructed when the main bearing device is assembled to the first end portion.

10. The opposed-piston engine of claim 7, further comprising a pair of through studs received in the bulkhead and configured to assemble the main bearing device to the first end portion and to assemble a main bearing cap to the second end portion.

11. The opposed-piston engine of claim 10, in which the clamping assembly comprises a clamp configured to act between the main bearing device and the cylinder liner and a biasing device situated between the clamp and the cylinder liner and configured to bias the cylinder liner against the cylinder block.

12. The opposed-piston engine of claim 11, in which the clamp comprises an annular body with a circular rim which transitions to a pair of radially opposing legs that define opposing arches.

13. The opposed-piston engine of claim 12, in which the biasing device comprises a Belleville device.

14. The opposed-piston engine of claim 11, in which the biasing device comprises a Belleville device.

15. A combination for an opposed-piston engine, comprising:

a cylinder block comprising a first crankcase configured to receive a first crankshaft, a second crankcase configured to receive a second crankshaft, and a bulkhead extending between the first crankcase and the second crankcase;

the bulkhead comprising a first end portion situated at the first crankcase and configured to receive a cylinder liner in cylinder space at least partially defined by the first end portion and a second end portion situated at the second crankcase and configured to receive a journal of the second crankshaft;

a main bearing device comprising a cylindrical bearing recess configured to support a journal of the first crankshaft and an attachment surface configured to attach the main bearing device to the first end portion; and, a pair of through studs received in the bulkhead and configured to assemble the main bearing device to the first end portion and to assemble a main bearing cap to the second end portion.

16. The combination of claim 15, further comprising a cylinder liner received in the cylinder space, and a clamp configured to act between the cylinder liner and the main bearing device so as to clamp the cylinder liner against the cylinder block.

17. The combination of claim 16, in which the cylinder liner comprises an intermediate portion with an outer diameter $D_M$ that is greater than a next largest outer diameter $D_E$ of the cylinder liner.

18. The combination of claim 17, further comprising a biasing device situated between the clamp and the cylinder liner.

19. The combination of claim 18, in which the clamp comprises an annular body with a circular rim which transitions to a pair of radially opposing legs that define opposing arches.

20. The combination of claim 19, in which the biasing device comprises a Belleville device.

21. The combination of claim 16, further comprising a biasing device situated between the clamp and the cylinder liner.

* * * * *